United States Patent Office 3,419,084
Patented Dec. 31, 1968

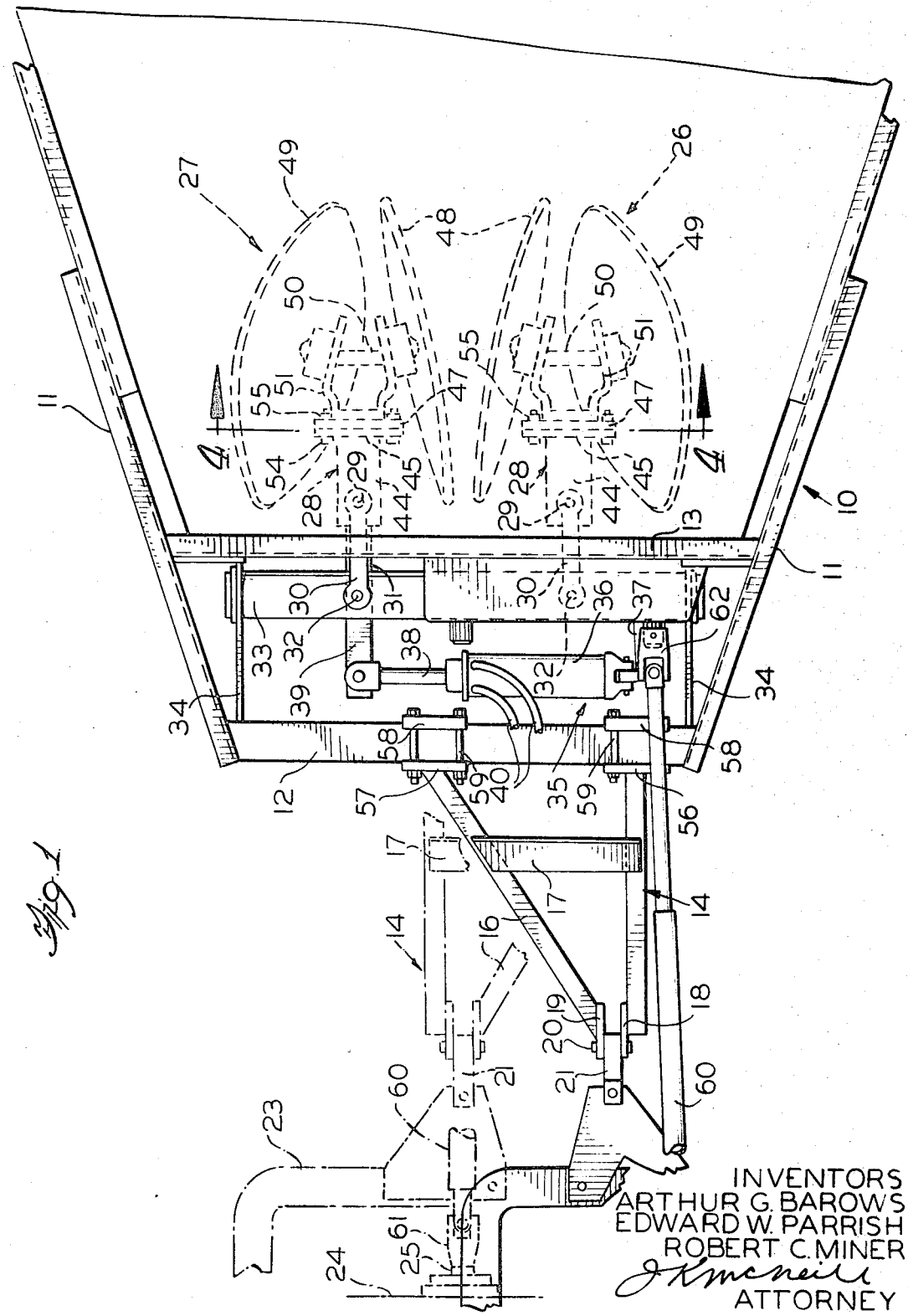

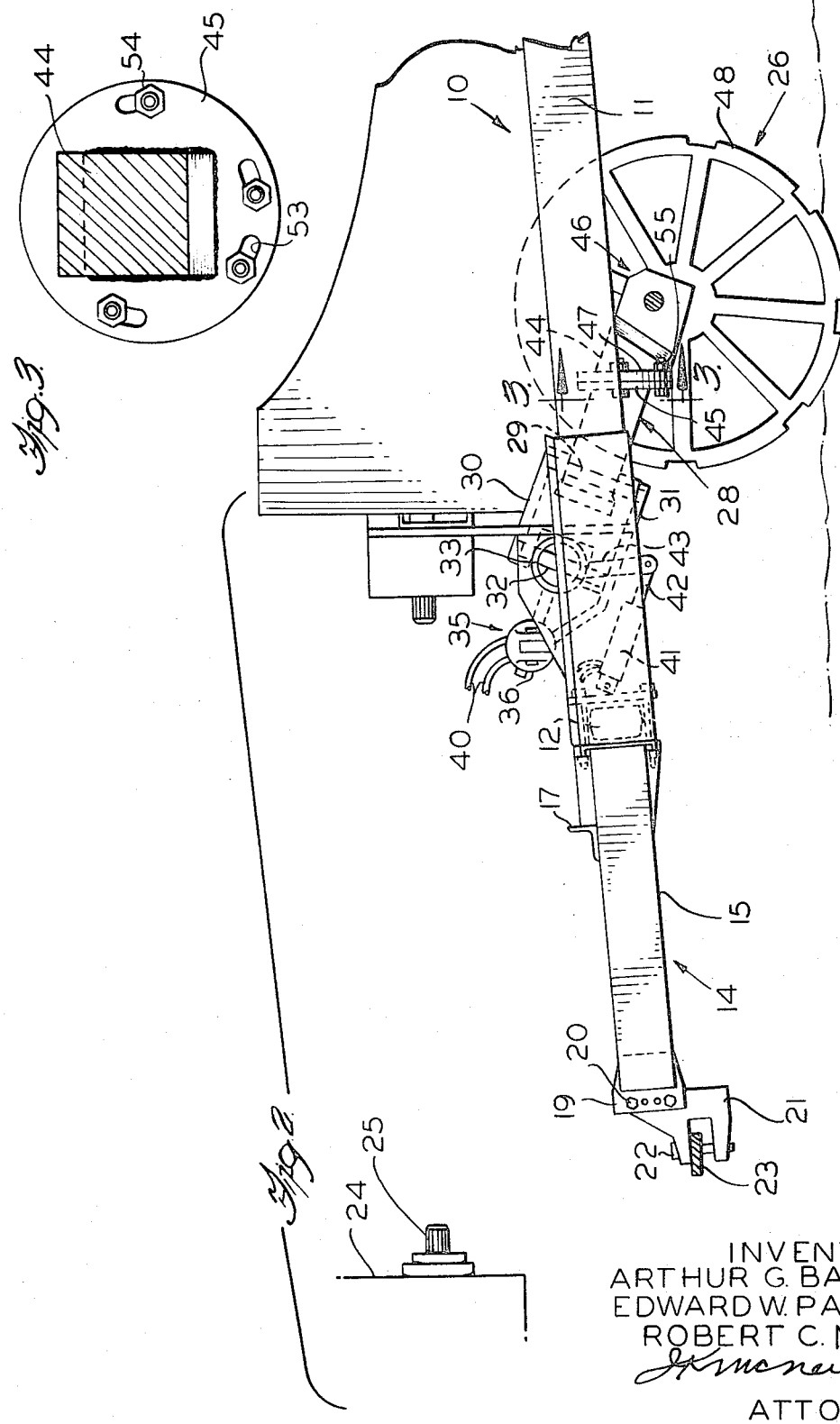

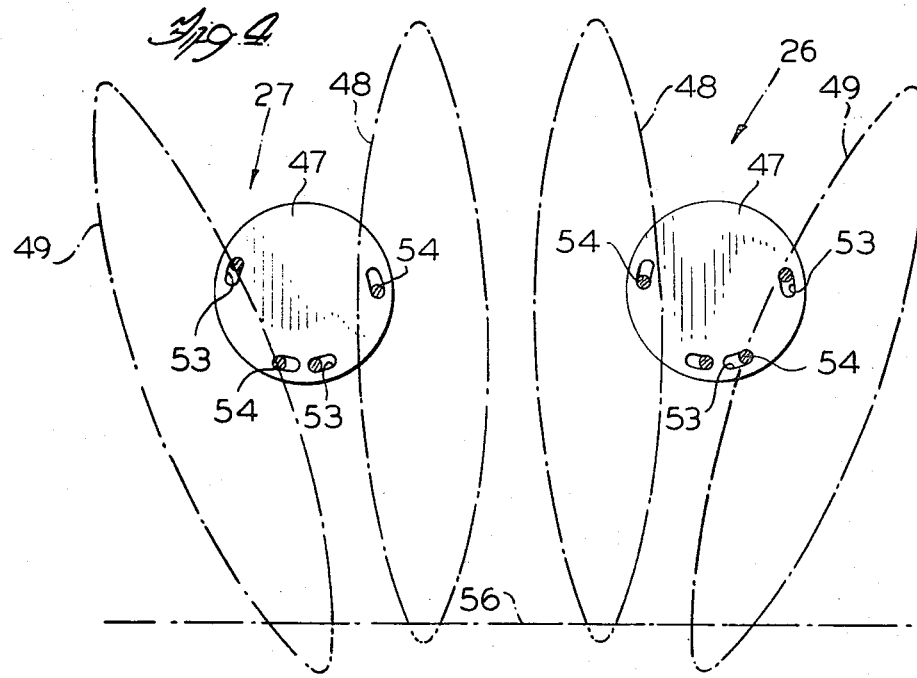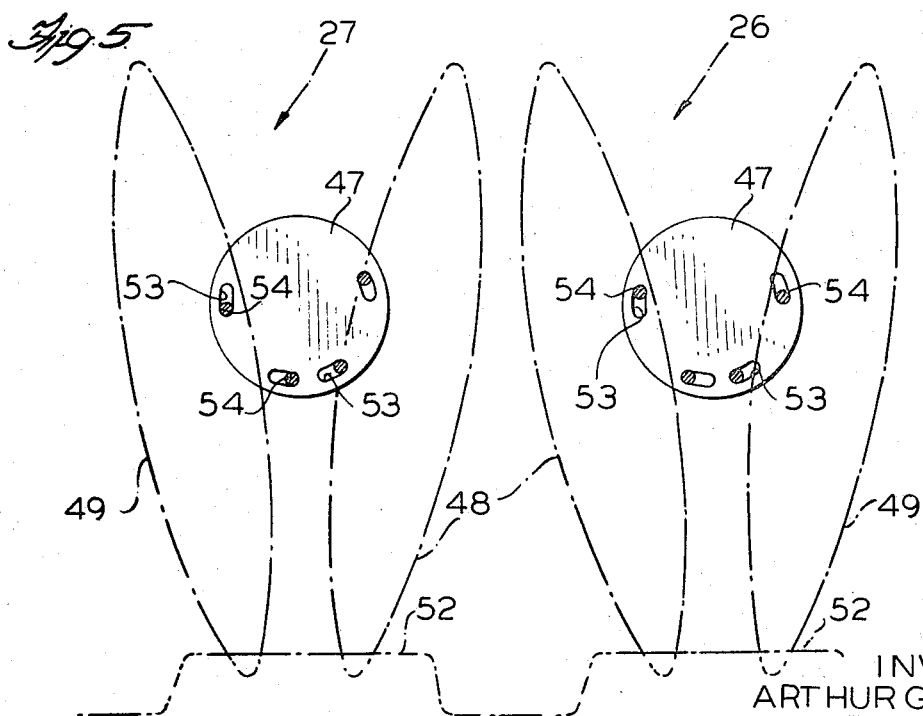

3,419,084
ROOT CROP HARVESTER
Arthur G. Barows, Downers Grove, Edward W. Parrish, Westmont, and Robert C. Miner, Clarendon Hills, Ill., assignors to International Harvester Company, Chicago, Ill., a corporation of New Jersey
Filed Oct. 22, 1965, Ser. No. 501,594
5 Claims. (Cl. 171—58)

ABSTRACT OF THE DISCLOSURE

Two pairs of downwardly and rearwardly converging puller wheels for beets and other root crops are provided for digging beets in separate rows, wherein the crops are relatively widely spaced and the angular relationship to the vertical is the same for the wheels of each pair. Means are provided for revolving the wheel support for each pair about a longitudinal axis to optionally dispose the inner wheel of the pair vertically while attaining the angle of convergence of the wheels to narrow the spacing between the earth-penetrating edges of the adjacent pairs and accommodate the puller wheels to narrower crop row spacing.

---

It is the custom with some beet growers to plant beets in separate beds and to utilize at least two digging assemblies to simultaneously dig two rows of the crop. Other growers form a somewhat wider bed but plant two rows of beets therein at opposite sides of the bed with narrow spacing between the crop rows.

An object of this invention is the provision of a novel multi-row digging assembly for root crops wherein means are provided for readily converting the machine from single row operation where a pair of diggers are provided for each of adjacent crop beds, to double bed operation where the same pair of diggers is utilized to dig two crop rows planted in a single bed.

Another object of the invention is the provision of a tractor drawn machine carrying beet puller devices wherein the pulling devices are convertible for single to double bed operation and means are provided for readily adjusting the hitch means to compensate for the conversion of the pullers.

Other objects and advantages of the invention will become clear from the following detailed description when read in conjunction with the accompanying drawings wherein:

FIGURE 1 is a plan view of a portion of a beet harvesting machine incorporating the features of this invention;

FIGURE 2 is a view in side elevation, partly in section, of a portion of the structure shown in FIGURE 1;

FIGURE 3 is a section taken on the line 3—3 FIGURE 2;

FIGURE 4 is a diagrammatic section taken on the line 4—4 of FIGURE 1, illustrating two pairs of beet puller wheels adjusted for double bed operation, and FIGURE 5 is a view similar to FIGURE 4 showing the same puller wheels in position for harvesting adjacent crop rows in single beds.

In the drawings, the numeral 10 designates the main supporting frame of a beet harvester mounted on wheels, not shown, and including forwardly converging side bars 11 connected at their forward ends by a transverse beam 12 and rearwardly thereof by a brace 13.

A triangularly shaped hitch structure 14 is secured to the forward transverse beam 12 and comprises a longitudinally extending hitch bar 15 and a diagonal bar 16 secured together by a crosspiece 17 and having secured to their forward ends plates 18 and 19 secured by bolts 20 to a clevis 21 connected by a pin 22 to the drawbar 23 of a tractor 24 having a power takeoff shaft 25.

A pair of left- and right-hand puller wheel units 26 and 27, respectively, are provided, and each includes a tool carrying member or standard 28, the upper end of which carries a pivot pin 29 upon the ends of which are mounted a pair of vertically spaced parallel links 30 and 31, the forward ends of which are mounted upon a pivot pin 32 carried by a transverse rockshaft in the form of a pipe 33, the ends of which are rotatably mounted in brackets 34 extending between and secured to beam 12 and brace 13. The puller wheel units 26 and 27 are thus capable of lateral swinging relative to the main frame, and such lateral movement is controlled for steering purposes by a hydraulic ram 35 comprising a cylinder 36 anchored to a lug 37 secured to pipe 33 and a piston rod 38 slidable in the cylinder and connected to a forward extension 39 of the lower right-hand parallel link 31. Operation of the ram 35 steers the wheel units 26 and 27, and for this purpose, fluid under pressure is supplied to the ram through hose lines 40 from a source of fluid under pressure carried by the tractor 24, and not shown.

The puller wheel units 26 and 27 may be raised and lowered by the provision of another cylinder 41, shown in FIGURE 2, anchored to beam 12 and having a piston rod 42 connected to an arm 43 affixed to shaft 33.

Tool-carrying member 28 comprises a relatively stationary upper section 44 extending downwardly and rearwardly from pipe 33 and having affixed to its rear end a vertical plate or annular flange member 45.

The tool-carrying standard 28 also includes a lower tool-carrying section 46 to which is affixed a mating annular flange or plate 47 in juxtaposition with flange 45. Section 46 carries a pair of downwardly and rearwardly converging beet puller wheels 48 and 49, wheel 48 being the inwardly disposed wheel in each furrow wheel assembly 26 and 27. The wheels 48 and 49 of each unit are rotatably mounted on the bent ends of an axle 50 carried by a yoke 51 forming a part of the lower standard section 46.

In FIGURE 5, the wheels 48 and 49 are symmetrically arranged and are disposed at substantially equal angles with respect to the ground. In this position the laterally spaced pairs of wheels are arranged to dig beets in separate hills 52, each pair of wheels straddling the center line of the crop row. The flange 47 is provided with a plurality of circumferentially spaced slots 53 to receive bolts 54 carried by flange 45, the bolts being disposed in one end of the slots in the single bed position of FIGURE 5. The pairs of wheels 48 and 49 are maintained rigidly in position by the provision of nuts 55 on bolts 54.

When the machine is to be operated upon a double bed as indicated at 56 in FIGURE 4, and is in the position illustrated in FIGURE 1, the nuts 55 are loosened and each wheel unit 26 and 27 rotated in opposite directions to angularly adjust plate 47 relative to plate 45 until the inner wheels 48 are substantially vertical and can, if desired, be brought closer together. In the double row indicated at 56 in FIGURE 4, the beets instead of being planted generally in the center line of the row shown in FIGURE 5, are planted toward the outer edges of the single hill. Suitable indexing means, not shown, may be provided on plates 45 and 47 to facilitate the uniform adjustment of the wheel units 26 and 27.

For the double bed position of the puller wheels as shown in FIGURES 1 and 4, the implement hitch structure 14 is disposed in the solid line position of FIGURE 1, with the draft point on the tractor drawbar laterally offset with regard to the center line of the tractor. The bars 15 and 16 of the hitch 14 have affixed to their rear ends, plates 56 and 57, respectively, adjustably secured to beam 12 by plates 58 and bolts 59. With the puller wheels in the single bed position of FIGURE 5, pin 22 is pulled from drawbar 23 of the tractor, bolts 59 removed, and hitch structure 14 rotated to the dotted line position shown in FIGURE 1 with pin 22 centered on drawbar 23. For parts on the harvesting machine to be driven from the power takeoff shaft 25, such parts not being shown, a telescoping drive shaft 60 is connected by a universal joint 61 with shaft 25 at one end and is provided at its other end with another universal joint 62 for connection in any suitable manner to the mechanism to be driven, and such drive is transmitted from the shaft 25 in any draft position of the implement relative to the tractor.

It is believed that the construction and operation of the novel root crop harvesting machine of this invention will be clearly understood from the foregoing description. It should likewise be understood that the invention has been described in its preferred embodiment and that modifications may be made therein without departing from the spirit of the invention or the scope of the appended claims.

What is claimed is:

1. Root crop digging apparatus comprising a traveling supporting frame, a tool-carrying member having an upper relatively stationary section attached to said frame and a lower tool-carrying section connected to said upper section and including laterally spaced downwardly and rearwardly converging earth-penetrating tools for lifting the roots from the ground during forward travel of the supporting frame, and means in the connection of said lower section to said upper section for adjusting said lower section as a unit relative to said upper section about a generally longitudinally extending axis to change the angle of said tools relative to the ground while retaining the angle of convergence therebetween and holding it in a selected adjusted position.

2. Root crop digging apparatus comprising a traveling supporting frame, a tool-carrying member having an upper relatively stationary section attached to said frame and a lower tool-carrying section connected to said upper section and including laterally spaced downwardly and rearwardly converging earth-penetrating tools for lifting the roots from the ground during forward travel of the supporting frame, and means in the connection of said lower section to said upper section for adjusting said lower section as a unit relative to said upper section about a generally longitudinally extending axis to change the angle of said tools relative to the ground while retaining the angle of convergence therebetween and holding said lower section in a selected adjusted position, said earth-penetrating tools comprising laterally spaced downwardly and rearwardly converging puller wheels disposed at substantially equal angles with respect to the ground, said lower section and said wheels being adjustable as a unit about said generally longitudinally extending axis to a position with one of said wheels disposed at a greater angle than the other with respect to the ground while retaining the angle of convergence of said puller wheels.

3. Root crop harvesting apparatus comprising a traveling supporting frame, a standard connected at one end to the frame, a pair of puller wheels, means mounting said wheels on the other end of said standard in downwardly and rearwardly converging relation and at substantially equal angles with respect to the ground, and means in the mounting of said puller wheels on said standard accommodating rotation of the wheels as a unit about an axis generally parallel to the direction of travel to increase the angle made by one of said wheels while decreasing the angle made by the other of said wheels with respect to the ground.

4. Beet harvesting apparatus for connection to a tractor having a drawbar comprising, a main supporting frame, laterally spaced puller wheel units, each unit including pairs of wheels disposed at converging angles with the ground and spaced to operate in crop rows having a certain spacing therebetween, means mounting each puller wheel unit on the supporting frame for angular adjustment thereof about a longitudinal axis between the wheels of each of said units to change the angles of said wheels with the ground while retaining the convergence angle thereof and accommodate said units to crop rows having another spacing therebetween, a hitch frame mounted on the forward end of the main supporting frame having means for connection to the tractor drawbar at a hitch point in accordance with one of said crop row spacings, and means for rigidly securing the hitch frame to said main supporting frame, said securing means being adjustable to accommodate lateral shifting of said hitch point in accordance with adjustment of said wheel units to said other crop row spacing.

5. The invention set forth in claim 4, wherein said hitch frame is triangular with one side parallel to the direction of travel and the side at right angles thereto affixed to the main supporting frame, the connection of the hitch frame to the main frame being releasable to accommodate rotation of the hitch frame about a longitudinal axis to accommodate said lateral shifting of the hitch point.

References Cited

UNITED STATES PATENTS

| | | | |
|---|---|---|---|
| 1,182,149 | 5/1916 | Douglass | 171—58 X |
| 2,944,611 | 7/1960 | Rollins | 171—58 |
| 3,070,175 | 12/1962 | McCollum | 171—58 |
| 3,243,945 | 4/1966 | Worrell | 56—377 X |
| 3,294,177 | 12/1966 | Schaal et al. | 171—58 |

ANTONIO F. GUIDA, *Primary Examiner.*